United States Patent
Turner et al.

(10) Patent No.: US 8,108,713 B2
(45) Date of Patent: Jan. 31, 2012

(54) ARRANGEMENT FOR RECOVERY OF DATA BY NETWORK NODES BASED ON RETRIEVAL OF ENCODED DATA DISTRIBUTED AMONG THE NETWORK NODES

(75) Inventors: Bryan C. Turner, Apex, NC (US); John Toebes, Cary, NC (US); Douglas Jay Walker, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/891,690

(22) Filed: Sep. 27, 2010

(65) Prior Publication Data

US 2011/0016351 A1    Jan. 20, 2011

Related U.S. Application Data

(63) Continuation of application No. 11/051,334, filed on Feb. 7, 2005, now Pat. No. 7,818,607, which is a continuation-in-part of application No. 10/859,209, filed on Jun. 3, 2004, now Pat. No. 7,203,871.

(51) Int. Cl.
*G06F 11/00* (2006.01)

(52) U.S. Cl. ........................ 714/6.2; 714/4.11

(58) Field of Classification Search ............ 714/4.11, 714/6.2
See application file for complete search history.

(56) References Cited

U.S. PATENT DOCUMENTS

| | | | |
|---|---|---|---|
| 5,134,619 A * | 7/1992 | Henson et al. | ............... 714/770 |
| 5,675,767 A | 10/1997 | Baird et al. | |
| 5,909,540 A | 6/1999 | Carter et al. | |
| 5,937,428 A | 8/1999 | Jantz | |
| 6,024,486 A | 2/2000 | Olarig et al. | |
| 6,154,852 A | 11/2000 | Amundson et al. | |
| 6,307,487 B1 | 10/2001 | Luby | |
| 6,373,406 B2 | 4/2002 | Luby | |
| 6,411,223 B1 | 6/2002 | Haken et al. | |
| 6,425,052 B1 | 7/2002 | Hashemi | |
| 6,486,803 B1 | 11/2002 | Luby et al. | |
| 6,516,350 B1 | 2/2003 | Lumelsky et al. | |
| 6,523,036 B1 | 2/2003 | Hickman et al. | |
| 6,529,917 B1 | 3/2003 | Zoltan | |
| 6,532,535 B1 | 3/2003 | Maffezzoni et al. | |
| 6,539,381 B1 | 3/2003 | Prasad et al. | |

(Continued)

OTHER PUBLICATIONS

U.S. Appl. No. 11/051,333, filed Feb. 7, 2005, Turner et al.

(Continued)

*Primary Examiner* — Yolanda L Wilson
(74) *Attorney, Agent, or Firm* — Leon R. Turkevich

(57) ABSTRACT

Distributed data, having been stored in a distributed storage system as a collection of distributed data elements, is recovered based on connection of multiple user nodes, each user node having stored selected distributed data elements as a corresponding portion of the distributed data during replication of the distributed data elements throughout the distributed storage system. Each distributed data element is identifiable by a corresponding unique object identifier (OID). Each user node includes a discovery resource for discovering reachable user nodes, a local cache configured for identifying at least the corresponding portion of the distributed data based on the respective OIDs, and an identification service module configured for resolving a data object to a corresponding OID, via the corresponding local cache, or based on sending a query to the reachable user nodes. Hence, user nodes can recover distributed data based on exchanging resolution information and OID information.

20 Claims, 6 Drawing Sheets

U.S. PATENT DOCUMENTS

| | | | |
|---|---|---|---|
| 6,549,949 | B1 | 4/2003 | Bowman-Amuah |
| 6,550,057 | B1 | 4/2003 | Bowman-Amuah |
| 6,557,111 | B1 | 4/2003 | Theimer et al. |
| 6,557,123 | B1 | 4/2003 | Wiencko, Jr. et al. |
| 6,560,609 | B1 | 5/2003 | Frey et al. |
| 6,567,818 | B1 | 5/2003 | Frey et al. |
| 6,571,282 | B1 | 5/2003 | Bowman-Amuah |
| 6,574,617 | B1 | 6/2003 | Immerman et al. |
| 6,574,749 | B1 | 6/2003 | Parsons |
| 6,574,750 | B1 | 6/2003 | Felber et al. |
| 6,578,068 | B1 | 6/2003 | Bowman-Amuah |
| 6,578,069 | B1 | 6/2003 | Hopmann et al. |
| 6,614,366 | B2 | 9/2003 | Luby |
| 6,742,137 | B1 | 5/2004 | Frey, Jr. |
| 6,779,025 | B1 | 8/2004 | Wolfe et al. |
| 6,883,110 | B1 * | 4/2005 | Goddard ............ 714/6 |
| 6,938,056 | B2 | 8/2005 | Burns et al. |
| 7,031,986 | B2 | 4/2006 | Ito |
| 7,203,871 | B2 | 4/2007 | Turner et al. |
| 7,634,566 | B2 | 12/2009 | Turner et al. |
| 7,689,715 | B1 | 3/2010 | Slaughter et al. |
| 7,818,607 | B2 | 10/2010 | Turner et al. |
| 2002/0059539 | A1 | 5/2002 | Anderson |
| 2002/0116659 | A1* | 8/2002 | Tormasov et al. ........ 714/5 |
| 2002/0138784 | A1 | 9/2002 | Mann et al. |
| 2002/0162047 | A1 | 10/2002 | Peters et al. |
| 2002/0190878 | A1 | 12/2002 | Luby |
| 2003/0058958 | A1 | 3/2003 | Shokrollahi et al. |
| 2003/0226089 | A1 | 12/2003 | Rasmussen |
| 2004/0021588 | A1 | 2/2004 | Luby |
| 2004/0075592 | A1 | 4/2004 | Shokrollahi et al. |
| 2004/0075593 | A1 | 4/2004 | Shokrollahi et al. |
| 2004/0101274 | A1 | 5/2004 | Foisy et al. |
| 2005/0010835 | A1* | 1/2005 | Childs et al. ............ 714/6 |
| 2005/0022051 | A1 | 1/2005 | Zane et al. |
| 2005/0229031 | A1 | 10/2005 | Kojenov et al. |
| 2007/0088977 | A1 | 4/2007 | Eguchi et al. |

OTHER PUBLICATIONS

Reed et al., "Polynomial Codes Over Certain Finite Fields", *J. Soc. Indust. Appl. Math.*, Jun. 1960, pp. 300-304, vol. 8, No. 2, cover sheet and pp. 300-304.

Cates, "Robust and Efficient Data Management for a Distributed Hash Table", Master's thesis, Mass. Institute of Technology, May 2003. pp. 1-64.

Liben-Nowell et al., "Analysis of the Evolution of Peer-to-Peer Systems", ACM Conf. On Principles of Distributed Computing (PODC), Monterey, CA, Jul. 2002, 10 pages.

Karger et al., "Finding Nearest Neighbors in Growth-restricted Metrics", ACM Symposium on Theory of Computing (STOC '92), Montreal, May 2002. 10 pages.

Stoica et al., "Chord: A Scalable Peer-to-peer Lookup Protocol for Internet Applications", (Date Unknown), pp. 1-14.

Cox et al., "Serving DNS using a Peer-to-Peer Lookup Service", In the proceedings of the First International Workshop on Peer-to-Peer Systems (IPTPS '02), Mar. 2002, Cambridge, MA, pp. 1-7.

Liben-Nowell et al., "Observations on the Dynamic Evolution of Peer-to-Peer Networks", In the proceedings of the First International Workshop on Peer-to-Peer Systems (IPTPS '02), Mar. 2002, Cambridge, MA, pp. 1-6.

Sit et al., "Security Considerations for Peer-to-Peer Distributed Hash Tables", In the proceedings of the First International Workshop on Peer-to-Peer Systems (IPTPS '02), Mar. 2002, Cambridge, MA, pp. 1-6.

Dabek, "A Cooperative File System", Master's Thesis, Massachusetts Institute of Technology, Sep. 2001, pp. 1-55.

Dabek et al., "Wide-area cooperative storage with CFS", ACM SOSP 2001, Banff, Oct. 2001, 14 pages.

Stoica et al., "Chord: A Scalable Peer-to-peer Lookup Service for Internet Applications", ACM SIGCOMM 2001, San Diego, Aug. 2001, pp. 149-160.

Dabek et al., "Building Peer-to-Peer Systems With Chord, a Distributed Lookup Service", Proceedings of the $8^{th}$ Workshop on Hot Topics in Operating Systems (HotOS-VIII), May 2001, 6 pages.

Petersen et al., "Flexible Update Propagation for Weakly Consistent Replication", Proceedings of the $16^{th}$ (ACM) Symposium on Operating Systems Principles (SSOP-16), Saint Malo, France, 1997, pp. 288-301.

Hildrum, "Why Do We Need Locality?", Feb. 17, 2004, http://oceanstore.cs.berkeley.edu/info/whytapestry.html, 2 pages.

Hildrum, "The Ocean Store Project", Feb. 17, 2004, http://oceanstore.cs.berkeley.edu/info/overview.html, 2 pages.

Wells, "The OceanStore Archive: Goals, Structures, and Self-Repair", U.C. Berkeley Masters Report, May 2000, pp. 1-20.

Burkard, "Herodotus: A Peer-to-Peer Web Archival System", Master's Thesis, Massachusetts Institute of Technology, Jun. 2002, pp. 1-64.

Joseph et al., "Evolution of grid computing architecture and grid adoption models", *IBM Systems Journal*, 2004, vol. 43, No. 4, pp. 624-645.

Bourbonnais et al, "Towards an information infrastructure for the grid", *IBM Systems Journal*, 2004, vol. 43, No. 4, pp. 665-688.

Meliksetian et al., "Design and implementation of an enterprise grid", *IBM Systems Journal*, 2004, vol. 43, No. 4, pp. 646-664.

Carpenter et al., "Abstract interdomain security assertions: A basis for extra-grid virtual organizations", *IBM Systems Journal*, 2004, vol. 43, No. 4, pp. 689-701.

Network Working Group, Request for Comments: 1094, "NFS: Network File System Protocol Specification", Mar. 1989, pp. 1-27.

\* cited by examiner

ARRANGEMENT FOR RECOVERY OF DATA BY NETWORK NODES BASED ON RETRIEVAL OF ENCODED DATA DISTRIBUTED AMONG THE NETWORK NODES

This application is a continuation of copending application Ser. No. 11/051,334, filed Feb. 7, 2005, which is a continuation-in-part of commonly-assigned, application Ser. No. 10/859,209, filed Jun. 3, 2004, entitled "ARRANGEMENT IN A NETWORK NODE FOR SECURE STORAGE AND RETRIEVAL OF ENCODED DATA DISTRIBUTED AMONG MULTIPLE NETWORK NODES", issued on Apr. 10, 2007 as U.S. Pat. No. 7,203,871, the disclosure of which is incorporated in its entirety herein by reference.

BACKGROUND OF THE INVENTION

1. Field of the Invention

The present invention relates to distributed storage of data in a secure and fault-tolerant manner that enables recovery of such data from distributed data nodes using fault-tolerant recovery techniques.

2. Description of the Related Art

Data storage and retrieval technology requires the availability of data in a timely manner. Basic data storage techniques involve generating a copy of the original data as a backup: such backup systems include simultaneous copying to two or more storage locations (e.g., simultaneous copying to two hard drives), and archival of data. Data archival has progressed from tape backup systems, to backups using compact disc (CD-R) technology, etc.

Such storage and retrieval techniques are substantially inefficient in terms of processing requirements, disk space, and time constraints. For example, distributed storage systems typically maintain duplicate copies of data on multiple, disparate machines to avoid failures in the case of one or more nodes fails. The distribution of duplicate copies, also referred to as r-replication, copies the data, in whole, among R separate storage devices in a system. In case of a failure, any one of the nodes may service a request for data.

The use of r-replication may be effective for closed storage services, such as servers having a Redundant Array of Inexpensive Disks (RAID), also referred to as RAID servers, or corporate mirroring servers. However, r-replication cannot be implemented efficiently in ad hoc or unreliable networks such as the Internet because each replication substantially increases the total storage requirements of the data; hence, typical implementations of r-replication use a minimal number of copies (e.g., a RAID 0 system uses only two copies (R=2).

In particular, use of an r-replication system is extremely inefficient if a given storage device is available on average only fifty percent of the time: if two storage nodes have a fifty percent availability, then the aggregate guaranteed data availability is limited to seventy-five percent for two copies (R=2). In other words, in order to guarantee ninety-five (95) percent availability, five copies (R=5) of the data would be required, effectively limiting the storage capacity of a system to twenty percent its total capacity. Further, the necessity of multiple read requests ordered sequentially to the duplicate storage devices substantially reduces the throughput of the system, especially each time a read request fails.

Another problem in using r-replication involves rogue nodes that maliciously or inadvertently return incorrect data to a requesting source (e.g., due to read/write errors or transmit/receive errors). Security against rogue nodes requires additional redundancy within the system, requiring an even higher number of duplicate copies to be added to the system.

Other problems associated with data storage involve large scale recovery of data, for example due to a disaster recovery scenario. Typical systems that rely on a centralized data store run the risk of complete data loss in the event the data storage is damaged or destroyed. Hence, conventional redundancy-based replication systems may be ineffective in the case that all the data stores are located within a specific geographic area having encountered a disaster (e.g., fire, etc.).

Still another problem associated with data storage involves the relative portability of data and the ability of users to access the data from different locations. One example involves an enterprise system having multiple offices, where a user moves from one office to another office. Conventional systems require a complete reconfiguration of the user's portable computer before access to any data store (e.g., e-mail) is possible.

The foregoing illustrate the difficulties encountered in providing an effective data recovery system in a disaster recovery scenario. Existing recovery techniques for recovery of data stored on large-scale data servers has required deployment of complex back up storage techniques, including tape drive backup systems. Tape drive backup systems, however, often require that the server be taken "off-line" in order to back up the stored data. Moreover, the tape medium used to back up the data usually is stored at the premises alongside the server; hence, if a data center encountered a disaster similar in scale to the World Trade Center attack or a natural disaster such as an earthquake or hurricane, both the data servers and the tape backup would be lost.

Even in cases where the tape medium is stored at a secure location that survives the disaster, data recovery is still a substantial effort: new data servers and tape drive recovery systems must be purchased and installed at a new site, the tape medium must be recovered from its secure location and loaded into the tape drive recovery system such that the backup data can be loaded from the tape medium onto the new data server. As apparent from the foregoing, however, such a system suffers from the disadvantage that substantial delays still may be encountered in establishing the new data server, even extending to days or weeks depending on the availability and acquisition of the new site, the tape medium, the new data server, and personnel to deploy the new data server.

In addition to the inevitable delay encountered in establishing the new data server, the most obvious problem encountered by users logging onto the new data server is that much of the most critical data for the users will either be unavailable or dated based on the last backup onto the recovered tape medium. Consequently, users will have lost their most recent data unless they have made their own backups onto their personal computers.

Storage of data on personal computers (e.g., laptop computers) also may not provide an acceptable solution in disaster data recovery due to the inherent inability of existing computers to automatically merge file systems. In particular, storage of data files on a local computer limits the availability of the data files to other users; in contrast, storage of the data files on a data server limits the availability of the data files when the user is disconnected from the network. Further, existing technologies would require users to manually copy the data files stored locally onto the new data server, which may result in errors or incomplete copies; further, problems arise if different users accidentally overwrite newer files with older versions of data files.

FIG. 1 is a diagram illustrating a conventional (prior art) system 10 in a computer, for example a personal computer or a laptop computer. The prior art system 10 includes a file system 12, a file allocation table (FAT) 14, a network file system (NFS) module 16, a Server Message Block (SMB) driver 18 and a File Sharing module 20. As described below, the file system 12 is configured to access one of the modules 14, 16, 18, 20 for a file requested by an application process 22 based on the corresponding name of the file; hence, the file system 12, upon attempting to open a file, already is able to identify which of the modules 14, 16, 18, or 20 to use to open the file based on the file name. Consequently, external nodes have a different view of the data compared to local applications 22 accessing data via the file system.

The SMB driver 18 utilizes SMB protocol for sharing files, printers, and serial ports, and communications abstractions between computers. SMB is a client server, request-response protocol. Note that if the SMB driver 18 were do employ caching, the SMB driver would implement redirect objects 24 to send requests back to the file system, enabling the SMB driver 18 to reach the FAT 14 via the file system 12. The NFS protocol used by the NFS module 16 is a network file system protocol initially established according to RFC 1094.

The File Sharing module 20 is a Microsoft Windows service that enables access of remote files or directories on remote nodes. As new nodes are added to the network, the new nodes may appear as additional network elements, however there is no means for automatically enabling a contribution of files from those newly added nodes into a collective organization of files.

Hence, there is no ability in the prior art for a piecemeal restoration based on incremental adding of clients to a network.

SUMMARY OF THE INVENTION

There is a need for an arrangement that data to be recovered from among different user nodes in an efficient and secure manner, without the necessity of deployment of a data recovery device separate from the user nodes.

There also is a need for an arrangement that enables automated recovery of data following a disaster scenario based on automatic creation of a recovered data system from recovered data objects based on connecting user nodes having stored respective components of the data objects.

These and other needs are attained by the present invention, where distributed data, having been stored in a distributed storage system as a collection of distributed data elements, is recovered based on connection of multiple user nodes, each user node having stored selected distributed data elements as a corresponding portion of the distributed data during replication of the distributed data elements throughout the distributed storage system. Each distributed data element also is identifiable by a corresponding unique object identifier. Each user node includes a discovery resource for discovering reachable user nodes, a local cache configured for identifying at least the corresponding portion of the distributed data based on the respective unique object identifiers, and an identification service module configured for resolving a data object to a corresponding unique object identifier, either via the corresponding local cache, or based on sending a query to the reachable user nodes. Hence, distributed data can be automatically recovered from user nodes as they attach to each other, based on exchanging resolution information and unique object identifier information.

One aspect of the present invention provides a method in a user node configured for connection to a network. The method includes connecting to a data link configured for providing connectivity with a connected user node, and establishing a recovered data storage system based on stored data elements having been replicated throughout a distributed storage system. Each of the stored data elements have a corresponding unique object identifier that is independent of any storage address on a storage medium. The establishing includes storing, in a table for each locally-stored data element having been stored in the user node based on the replication throughout the distributed storage system, the corresponding unique object identifier and a corresponding stored location of the corresponding locally-stored data element. The connected user node detects whether the connected user node is reachable via the data link. The establishment of the recovered data storage system also is based on selectively sending to the connected user node at least one of the unique object identifiers stored in the table in response to a query from the connected user node that specifies an attribute of the stored data element associated with the at least one object identifier; a second query is selectively sent to the connected user node that specifies an attribute of a data element determined to be absent from the user node. The establishing also includes selectively storing, in response to reception thereof from the connected user node, any received unique object identifiers that are distinct from the unique object identifiers stored in the table, the unique object identifiers and said any received unique object identifiers identifying the stored data elements having been recovered in the recovered data storage system. The received unique object identifiers include the unique object identifier for the data element determined to be absent from the user node.

Another aspect of the present invention provides a method in a network having a data link configured for providing connectivity. The method includes connecting by a first user node to the data link, the first user node having a first group of stored data elements having been stored in the first user node based on the first user node having been in communication with a distributed storage system having replicated the stored data elements. Each of the stored data elements have a corresponding unique object identifier that is independent of any storage address on a storage medium, the first user node further including a table having a corresponding first group of the unique object identifiers for identifying the respective first group of data elements. The method also includes connecting by a second user node to the data link, the second user node having a second group of the stored data elements having been stored in the second user node based on the second user node having been in communication with the distributed storage system having replicated the stored data elements, the second user node further including a corresponding table having a corresponding second group of the unique object identifiers for identifying the respective second group of data elements. The method also includes selectively supplying by at least one of the first and second user nodes at least a corresponding distinct one of the unique object identifiers from among the first and second groups, respectively based on discovery of the second and first user nodes and in response to a query received by the at least one of the first and second user nodes, the first and second user nodes establishing a recovered data storage system based on a union of the first and second groups of unique object identifiers based on mutual discovery of the first and second user nodes via the data link, each unique object identifier being independent of any storage address on any storage medium.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment employs a network having a distributed services network architecture that enables distributed network nodes to provide distributed services. In particular, the distributed network services architecture is based on implementing a distributed storage system for the distributed storage of data objects, and a distributed file system that enables mapping of namespaces (i.e., fully qualified names of respective data files) to unique object identifiers that identify respective data objects, based on the unique object identifiers having values independent of any storage location.

The disclosed embodiment exploits the inherent portability of personal computers (e.g., laptop computers) in order to implement the distributed network nodes described herein. Consequently, a distributed network node implemented as a laptop computer can continue to provide access to distributed services and access to distributed data objects having been locally stored on the laptop computer for a user while disconnected from the network.

Moreover, the distributed network node implemented as a laptop computer also can be used to automatically establish a recovered network, having a recovered data storage system, based on reconnecting with additional distributed network nodes in the event that a large-scale disaster has destroyed the prior network that included the distributed storage system.

Figure 1:
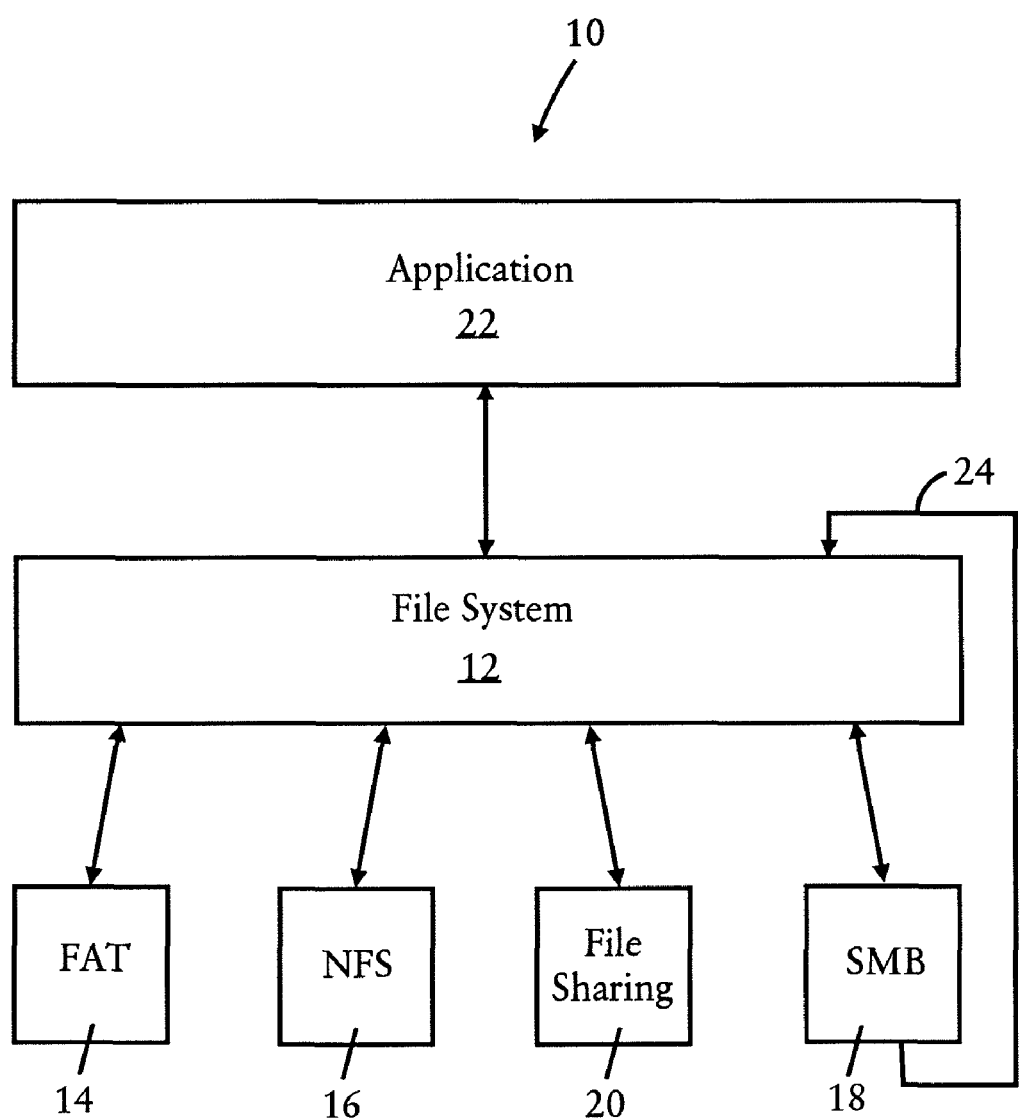
FIG. 1 is a diagram illustrating a (prior art) file system in a user node.
Figure 2:
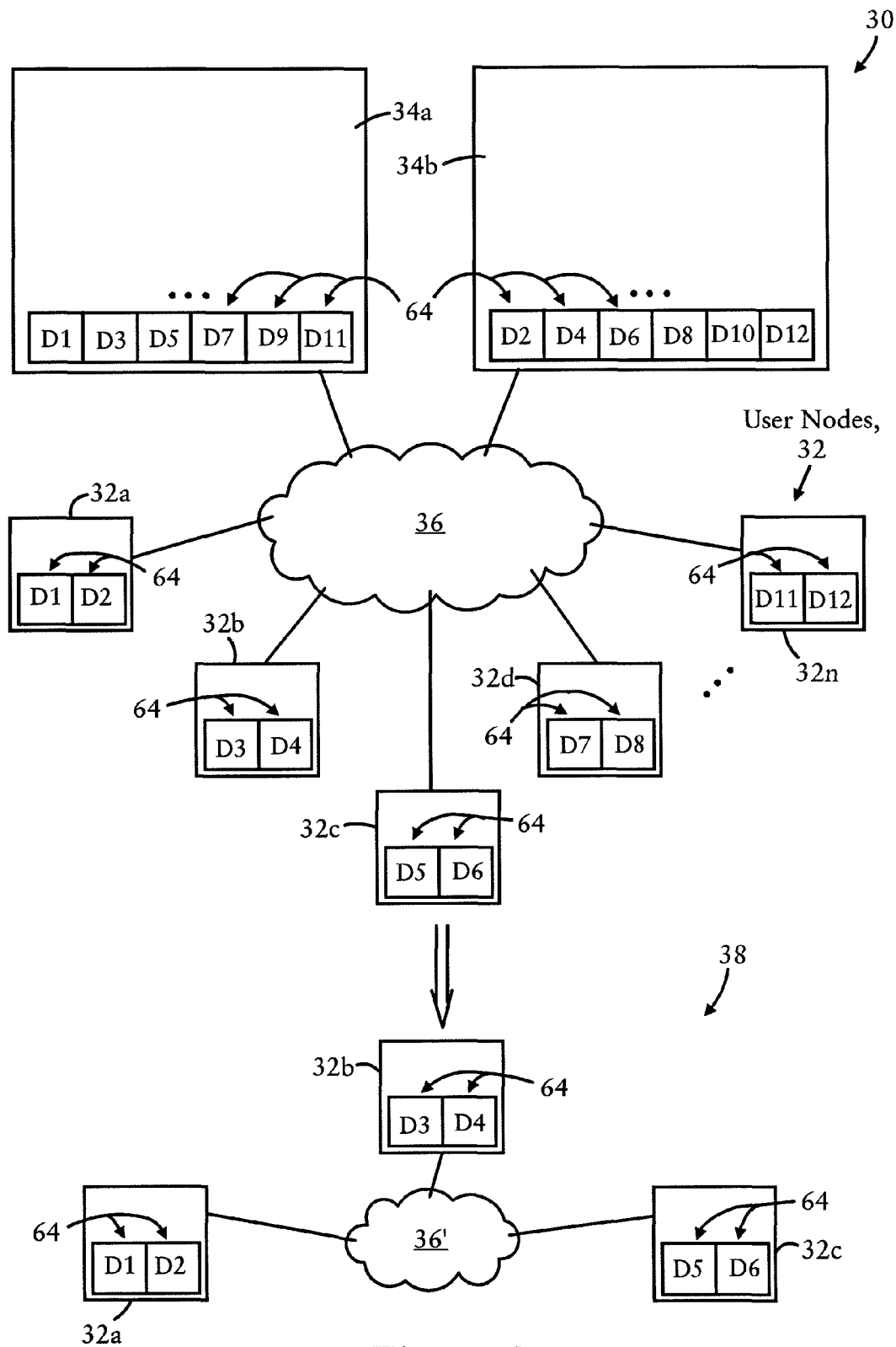
FIG. 2 is a diagram illustrating a recovered data storage system from a distributed storage system, according to an embodiment of the present invention.

FIG. 2 is a diagram illustrating the recovery of a data storage system (as a recovered data storage system) by multiple user nodes based on recovering stored data elements (e.g., D1, D2, . . . D6) 64 having been replicated throughout a distributed storage system, according to an embodiment of the present invention. As illustrated in FIG. 2, a distributed storage system 30 includes multiple user nodes 32a, 32b, 32c, 32d, . . . 32n, and network service nodes 34a and 34b that are connected via a data link 36 configured for providing connectivity between the nodes 32 and 34.

Each of the user nodes 32 is implemented as a portable computer (e.g., laptop or notebook computer) that may have any one of a variety of available network interfaces, for example a 56 kbps modem, 10/100/1000 MBps Ethernet adapter, a wireless interface (e.g., IEEE 802.11b or 802.11g or Bluetooth), and a data storage capacity on the order of 40-160 Gigabytes (Gb).

Each network service node 34a and 34b is implemented as a fixed (i.e., stationary) computing device having substantially higher processing and storage capacity than any one of the user nodes 32, for example on the order of 500 Gb. Hence, each network service node 34a and 34b is distinguishable from the user nodes in that it is considered a fixed part of the network infrastructure of the network 30.

Hence, the maximum storage capacity of the network 30 equals the combined storage capacity of the network service nodes 34a and 34b (e.g., 2 times 500 Gb equals one Terabyte (Tb)), plus the combined storage capacity of the user nodes 32 (e.g., 10 times 160 Gb equals 1.6 Tb, where n=10).

Unlike prior art client-server based networks that rely on data servers to store substantially all network data with clients storing only a small portion of client-specific data, for example as working copies of data to be stored on the data servers, the disclosed embodiment employs the user nodes 32 as part of a distributed system that replicates data objects 64 stored in the network service nodes 34a and/or 34b among the user nodes 32. In particular, data replication is performed in a secure manner, for example as described in the above-incorporated application Ser. No. 10/859,209, ensuring that each data object stored (e.g., D1) 64 in either network service node 34a or 34b also is stored in at least one user node (e.g., 32a). As described in the above-incorporated application Ser. No. 10/859,209, each data object 64 can be stored as an encoded data unit to ensure security; further, use of Reed-Solomon encoding enables any user node 32 to recover a file (i.e., an "unencoded data unit") based on obtaining a minimum number of encoded data units (N=4) 64 in order to recover the unencoded data unit. Hence the term "replication" also encompasses Reed-Solomon based N of M replication, where replication of an unencoded data element into M encoded data elements 64 enables recovery of the unencoded data element based on retrieval of at least N encoded data units, where N is less than M.

Hence, replication of each data object 64 in any one service node 34a or 34b (e.g., D4) in the distributed storage system 30 by a factor or two (2× replication) ensures that at least one user node (e.g., 32b) has a copy of the data object 64; higher replication factors enable multiple copies of data objects to be stored on respective user nodes 32, increasing the probability that any given user node 32 will have a given data object 64 of the distributed storage system 30. As described in the above-incorporated application Ser. No. 10/859,209, a file (i.e., an unencoded data unit) can be recovered based on obtaining any N of M encoded data units 64. Hence, a data file can be recovered even if all M encoded data units 64 have not been recovered, based on retrieval of N of the M encoded data units 64.

In addition, each data object 64, is identified by a corresponding globally-unique object identifier, as described in commonly-assigned, copending application Ser. No. 11/051,333, filed Feb. 7, 2005, entitled "ARRANGEMENT FOR A DISTRIBUTED FILE SYSTEM HAVING DATA OBJECTS MAPPED INDEPENDENT OF ANY DATA OBJECT ATTRIBUTE", the disclosure of which is incorporated in its entirety herein by reference. The features of the above-incorporated application Ser. No. 11/051,333, are applied in the disclosed embodiment of the subject application, such that each node in the distributed file system 30, including the user nodes 32, has a file system. As described below with respect to FIG. 4, the file system includes a plurality of directory entries 74, where each directory entry 74 has a file name field 70, an attributes field 72, and an object identifier field 68 configured for specifying a globally-unique object identifier. The globally-unique object identifier 68 is universally reachable by any node 32 of the distributed file system 30 and uniquely identifies the data object 64, enabling the data object to be universally identifiable by any node 32 or 34 based on the corresponding object identifier. The data object 64 also can be stored independently of a device file system based on providing a resolution between the data file name 70 and its object identifier 68, followed by a resolution between the object identifier and a selected location 66 for the data object 64.

As apparent from the foregoing, any data object 64, including the directory entries 74 and associated resolution tables (e.g., data object name-to object identifier, object identifier-to location) described in the above-incorporated application Ser. No. 11/051,333, filed Feb. 7, 2005 also can be replicated to different nodes 32, ensuring that the file system deployed in the distributed storage system 30 also can be recovered by the user nodes 32 in the event of a disaster that eliminates the network service nodes 34a and 34b.

Hence, each of the user nodes 32 include selected locally-stored data elements 64 based on replication of the data elements 64 throughout the distributed storage system 30, enabling the user nodes 32 to establish a recovered data storage system 38 based on reconnecting via a new data link 36' (e.g., at a new facility such as a temporary office). The extent to which the recovered data storage system 38 includes the original stored data elements 64 of the original system 30 depends on the number of user nodes 32 connected via the new link 36', and the replication factor that was originally used in the distributed storage system 30. For example, the successive addition of each user node 32a, 32b, 32c, etc. to the network 38 could result in recovery of 18%, 23%, 31%, etc. of the original data of the network 30, respectively. It will be apparent that the storage of the same data within different user nodes 32 will reduce the relative contribution of each added user node 32, but will improve the integrity of the recovered data.

In addition, modify/write controls can be renewed among the connected user nodes of the recovered data storage system 38 as described in detail in commonly-assigned, copending application Ser. No. 10/859,208, filed Jun. 3, 2004, entitled "ARRANGEMENT IN A NETWORK FOR PASSING CONTROL OF DISTRIBUTED DATA BETWEEN NETWORK NODES FOR OPTIMIZED CLIENT ACCESS BASED ON LOCALITY", the disclosure of which is incorporated in its entirety herein by reference.

Figure 3:
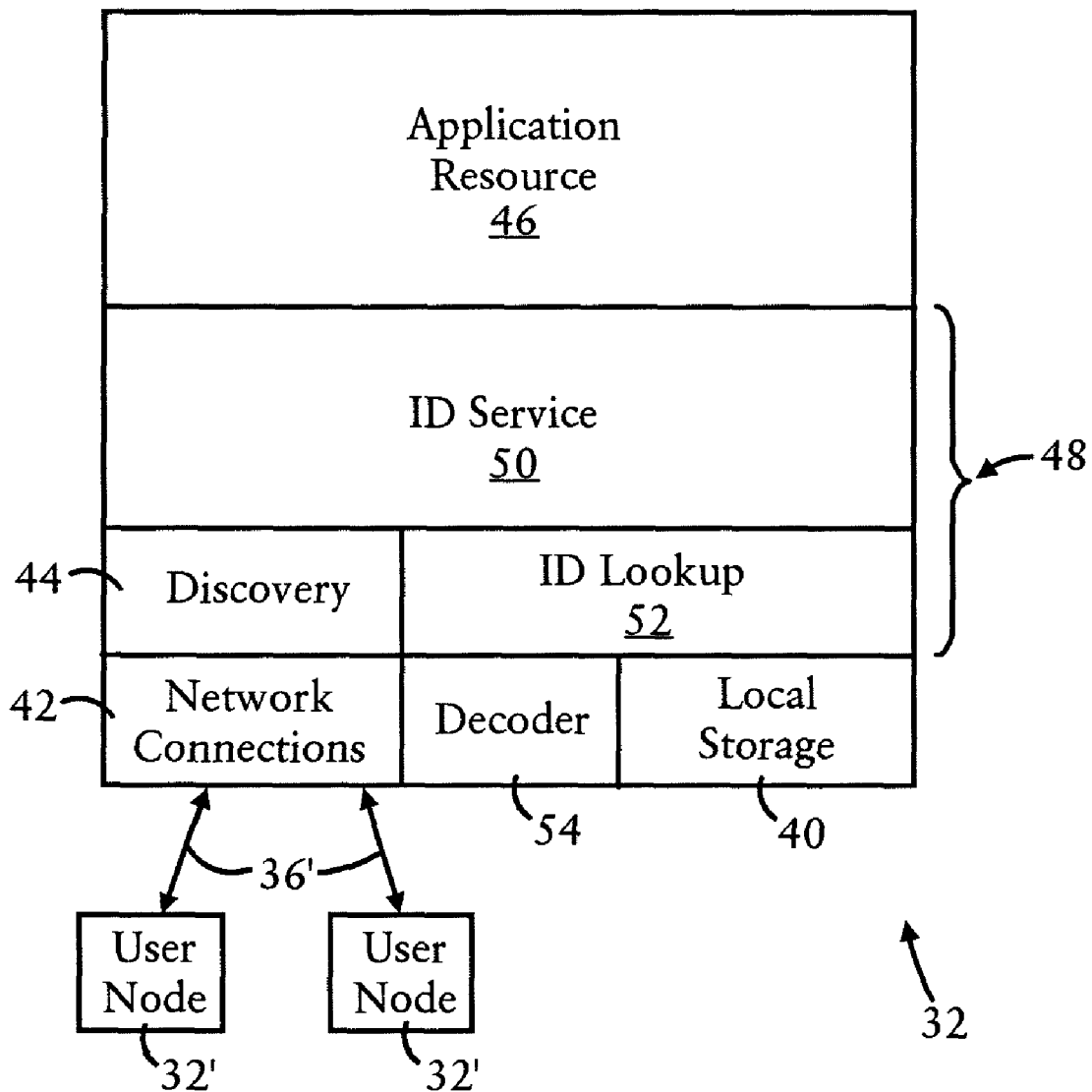
FIG. 3 is a diagram illustrating one of the user nodes of FIG. 2, according to an embodiment of the present invention.

FIG. 3 is a diagram illustrating a user node 32 configured for providing distributed storage services in the distributed storage network 30, and configured for establishing a recovered data storage system 38, according to an embodiment of the present invention. The user node 32 includes a data storage medium 40, a network connection resource 42, a discovery resource 44, at least one application resource 46, and an identification module 48 that includes an identification service module 50, an object identifier lookup module 52, and a Reed-Solomon decoder 54.

The network connection resource 42 is configured for connecting to the data link 36 and 36' in order to connect with another user node 32' connected to the link 36'. The discovery resource 44 is configured for detecting a presence of each connected user node 32' based on whether the connected user node 32' is reachable via the data link 36'. The discovery resource 44 is configured for communicating with the connected user node 32' in order to establish the recovered data storage system 38 based on a prescribed authentication procedures with the connected user node 32' (e.g., password or key authentication, etc.), in order to verify that the connected user node 32' was part of the original distributed storage system 30. Once the discovery resource 44 acknowledges the membership of the connected user node(s) 32' to the original distributed storage system 30, the user nodes 32 and 32' implement a protocol to exchange information in order to share locally-stored data objects 64 and associated object identifiers, in order to create a "collective" data storage system 38 representing a recovered data storage system based on exchange of information between the connected user nodes 32 and 32'.

As described below in detail with respect to FIG. 4, the data storage medium 40 is configured for storing locally-stored data elements 64 that were stored based on communications with the original distributed storage system 30 that included the service nodes 34a and 34b and that replicated the stored data elements 64.

Figure 4:
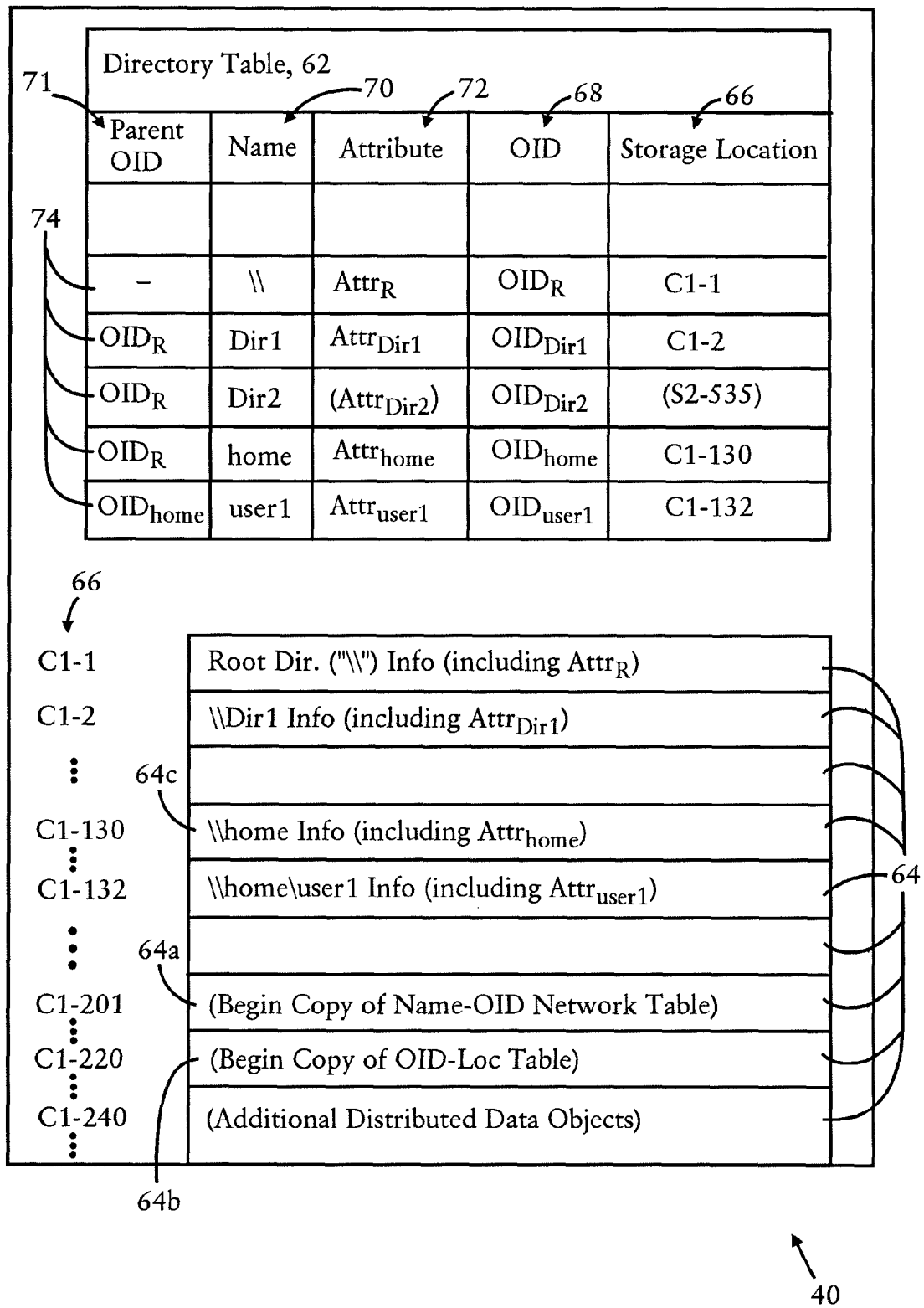
FIG. 4 is a diagram illustrating the local data storage in the user node of FIG. 2.

FIG. 4 is a diagram illustrating in detail the data storage medium 40. The data storage medium 40 includes a directory table 62, and data objects 64 stored at respective locations 66. Each of the stored data elements 64 has a corresponding unique object identifier (OID) 68 that is independent of any attribute of the data element 64, including the storage address 66 on a storage medium. As illustrated in FIG. 4, the directory table 62 includes entries 74, each configured for storing for each locally-stored data element 64 a corresponding unique object identifier 68 and a corresponding stored location 66 of the corresponding locally-stored data element 64, as well as a name field 70 specifying the name of the data object 64, and an attributes field 72 specifying attributes of the corresponding data object 64. Each entry 74 is configured for storing the parent directory OID 71, and the object name 70. Hence, the disclosed embodiment employs a file system that eliminates the necessity of fully qualified names based on identifying parent-child relationships based on child name 70 and parent OIDs 71.

One of the data objects 64a stored locally is a replication of at least a portion of the network-based Name-OID table used for resolving namespace queries (i.e., queries that specify a fully qualified name) to a corresponding unique OID 68; in contrast to the directory table 62, the data object 64a represents at least a portion of the network-wide Name-OID table that specifies all known OIDs for known namespaces in the distributed storage system 30; hence, if a sufficient number of user nodes 32 are available to reassemble the entire Name-OID table, the entire namespace of the distributed storage system 30 can be recovered.

Another data object 64b is a replication of at least a portion of an OID-to-Location table that is used for resolving queries that request a storage location 66 of the data object 64 based on the corresponding object identifier (e.g., $OID_R$) 68. As described in the above-incorporated application Ser. No. 11/051,333, the location resolution table may include multiple location entries for a given object identifier, enabling identification of a storage location that is most appropriate for the requester, based on determined attributes such as security, locality, network traffic, node utilization, etc. If a sufficient number of user nodes 32 are available to reassemble the entire OID-to-Location table, the location of the data within the distributed storage system can be recovered, enabling the directory table 62 to be updated accordingly.

Once the user nodes 32 have employed the prescribed authentication protocols using their discovery resources 44, the user nodes can begin exchanging data object information (e.g., file names 70, attributes 72, OIDs 68, location information 66, and/or locally-stored data objects 64) to establish a recovered storage system.

The identification module 48 of FIG. 3 is configured for identifying a stored data element 64 in response to a query from either a local executable application 46 or a connected user node 32'. In particular, the identification service 50 is configured for selectively sending to the connected user node 32' a unique object identifier (e.g., $OID_{user1}$) stored in its directory table 62 in response to a query from the connected user node 32' that specifies the corresponding locally-stored data element 64, e.g., based on the query specifying at least a name ("home") 70, and the parent OID 71, if available. Hence, the identification service 50 provides namespace resolution for user nodes 32 connected via the link 36'.

The identification service 50 is configured for providing namespace resolution for locally-executable applications. In response to resolving a name 70 (e.g., "home") to a corresponding OID 68, the identification service 50 passes the OID (e.g., $OID_{home}$) to the ID lookup module 52. The ID lookup module 52 is configured for resolving the storage location 66 for a corresponding OID; if the storage location is locally-available, the lookup module 52 retrieves the corresponding object 64 from the determined storage location; if the storage location is reachable via a connected user node 32', the lookup module 52 requests the data object 64 from the connected user node 32' via the network connections 42 by specifying the corresponding OID 68 and/or the location 66.

If the storage location 66 for the data object 64 (e.g., "\\Dir2") is unreachable (e.g., "S2-535" was in the destroyed service node 34b), the ID lookup module 52 sends a query to all the connected user nodes 32' via the network connections 42 for an alternate storage location 66 for a replica of the corresponding data object (e.g., "\\Dir2"), based on specifying the corresponding OID (e.g., $OID_{Dir2}$).

In addition, the identification service 50 is configured for utilizing the Reed-Solomon decoder 54 in order to recover files from multiple encoded data objects 64, retrieved locally from the local storage 40 and/or retrieved via the data link 36'. As apparent from the foregoing, the identification service 50 and/or the ID lookup module 52 are configured for caching information (e.g., fully qualified names, attributes 72, OIDs 68, and/or storage locations 66, or data objects 64) retrieved from other user nodes 32 via the data link 36.

Figure 5:
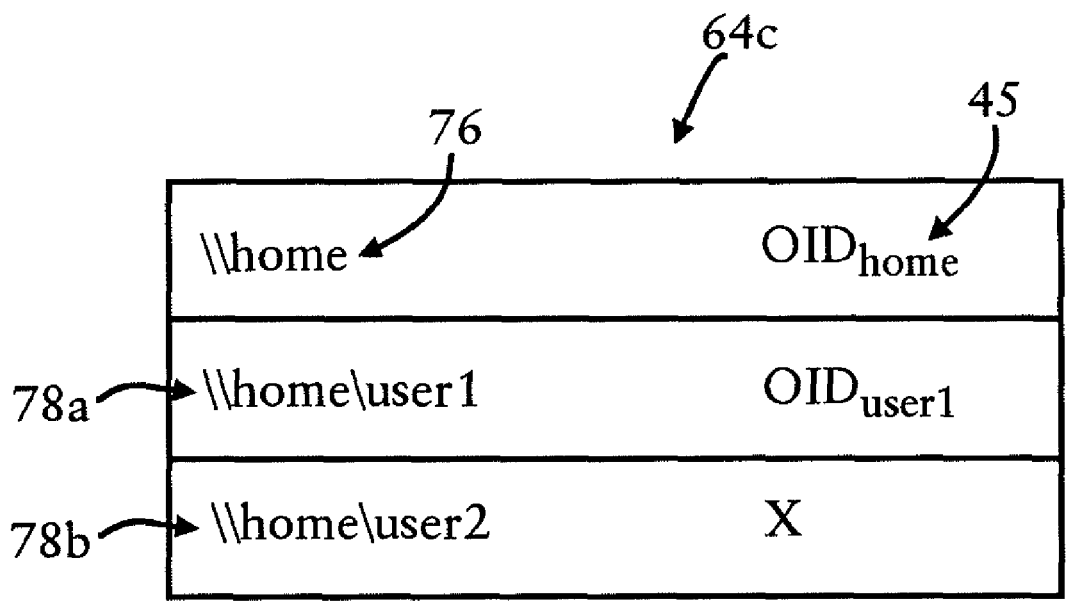
FIG. 5 is a diagram illustrating a directory entry in the local data storage of FIG. 4.

FIG. 5 is a diagram illustrating the data object 64c, which stores the directory entry 45 configured for identifying a structure of a directory ("\\home") 76 utilized by the user node 32 (e.g., 32a). In particular, assume the directory "\\home" 76 has the subdirectories "\\home\user1" 78a and "\\home\user2" 78b, however the entry 45 does not have the corresponding OID 68 for the subdirectory "\\home\user2" 78b. In this case, the ID service module 50 sends a request to any connected user node 32' for the value of the corresponding absent OID (e.g., "$OID_{user2}$") 68 for the subdirectory 78b. Also note that if the application 46 requests a data object 64 having an unrecognized name (e.g., "\\home\user3") that is not in the directory table 62, the identification service module 50 will send a query specifying the name to the connected user nodes 32.

Figure 6:
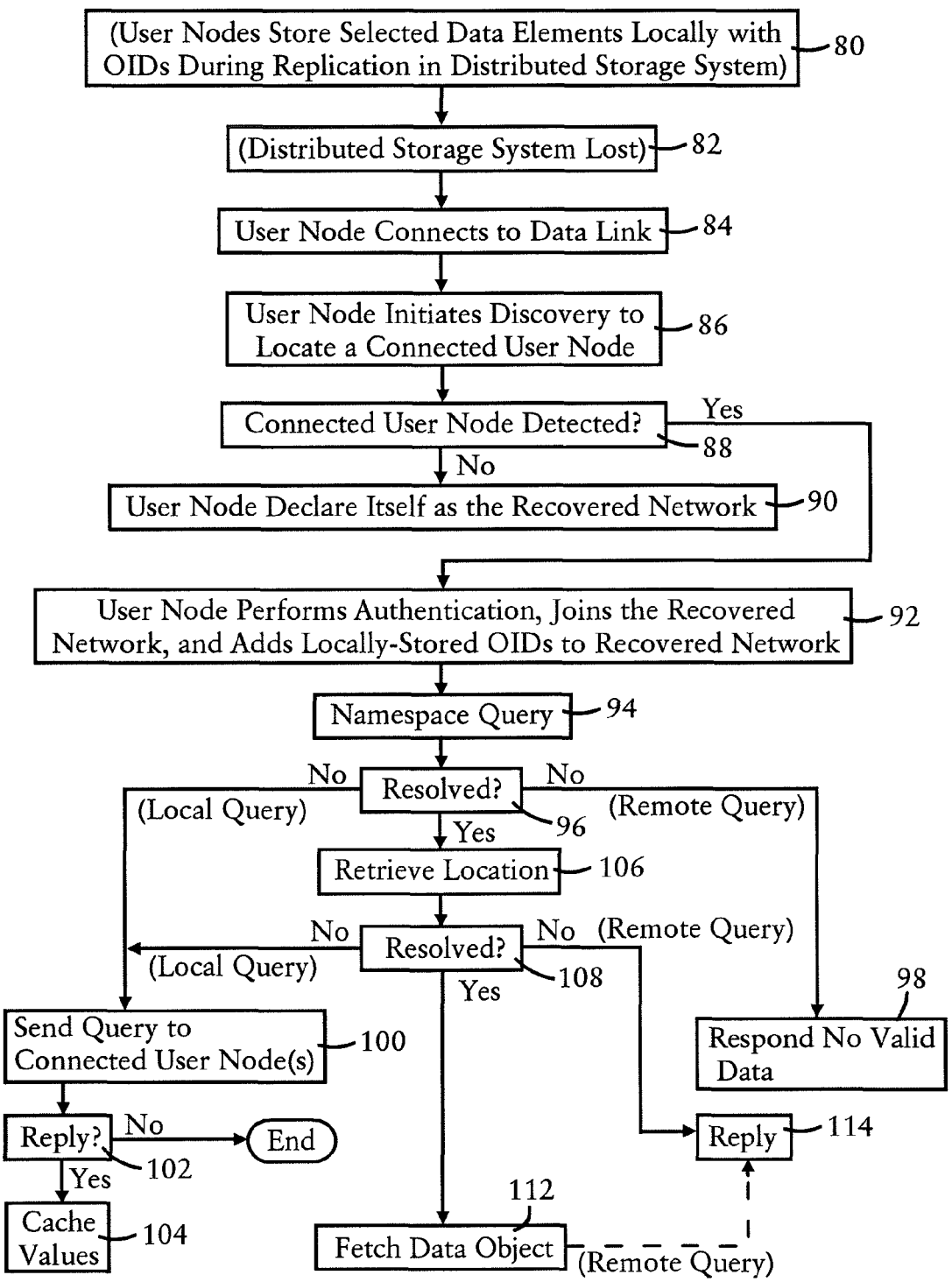
FIG. 6 is a diagram illustrating the method of establishing a recovered data storage system, according to an embodiment of the present invention.

FIG. 6 is a diagram illustrating the method of establishing a recovered data storage system by the user nodes of FIG. 2, according to an embodiment of the present invention. The steps described herein can be implemented in each user node 32 as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 80, where each of the user nodes 32 (e.g., 32a, 32b, . . . 32n) receive for storage selected data elements 64 based on the above-described Reed-Solomon based replication by the original distributed storage system 30. As described above, each data element 64 has a corresponding OID 68, and at least one storage location 66, although replication can create multiple storage locations throughout the network 30. Hence, each user node 32 will maintain a local storage medium 40, as illustrated in FIG. 4, that includes the locally-stored data elements 64 having been supplied to the corresponding node 32 based on the above-described replication. In addition, each user node 32 also may include attributes of the distributed storage system 30, including at least a portion of the Name-OID network table 64a and the OID-Loc table 64b.

Assume in step 82 that the distributed storage system 30 is lost, namely that the service nodes 34a and 34b are no longer available. Although the distributed storage system 30 is obviously lost if a disaster is encountered, less dramatic examples include a loss of connectivity based on a failure in the default data link 36 (e.g., a data link switch failure), or if all the user nodes relocate to an alternate location (e.g., for a business trip).

Hence, in step 84 the network connections resource 42 in the first user node (e.g., 32a) connects to a new data link 36', for example a wireless data link. The discovery resource 44 initiates prescribed discovery routines in step 86 to determine if another connected user node 32' is present (i.e., another connected user node has already established itself as "the recovered network"). If in step 88 the discovery resource 44 detects no other user node 32, the discovery resource 44 determines the corresponding user node 32 is the first user node having connected to the link 36' and therefore declares in step 90 that the corresponding user node 32 (e.g., 32a) is "the recovered network".

However if in step 88 the discovery resource 44 detects another user node (e.g., 32b) connected to the data link 36', the discovery resource 44 in the user node 32a performs authentication in step 92 with the corresponding discovery resource 44 in the existing user node (e.g., 32b) in order to verify that both user nodes (e.g., 32a and 32b) belong to the same collection and share data objects having originated from the same distributed storage system 30. The user node (e.g., 32a) then joins in step 92 the recovered network 38 setting internal permissions to allow its locally-stored information (e.g., OIDs 68) stored in its cache/directory table 62 to be shared with the other user nodes. The addition of locally-stored information (e.g., OIDs 68) may be passive (i.e., reactive to requests from the peer user nodes) or active (i.e., proactive by actively transmitting OIDs 68 to the peer user nodes), although the disclosed embodiment preferably is passive enabling the client devices to use the recovered network 38 even though a rebuild of all directory structures has not been completed. Hence, the steps described below illustrate a passive exchange of information during establishment of the recovered data storage system 38.

Assume in step 94 that the identification service 50 receives a namespace query requesting the OID 68 corresponding to a fully qualified name 70. The namespace query may be generated by a local application 46, or supplied via the data link 36' from another user node 32. If in step 96 the identification service 50 cannot resolve the name, the identification service 50 responds in step 98 that it has no valid data to resolve the query if the query was from another user node 32; if the query was a local query from a local application 46, the identification service sends in step 100 the query specifying the fully qualified name 70 to the connected user nodes 32 via the data link 36'. If in step 102 there is a reply that includes the OID and selectively the stored data element 64, the information is stored in step 104 by the information service 50 into the storage medium 40. In particular, the identification service 50 stores the OID specified in the reply, the data element 64 (if supplied in the reply), and an identification of the node having sent the reply. Hence, the identification service 50 creates a binding between the relevant OID and the user node 32 that controls ownership of the corresponding data element 64.

If in step 96 the identification service 50 resolves the name 70, the identification service 50 can simply return the name with its corresponding OID 68 for a remote query; alternately, the identification service 50 can pass the OID 68 to the ID lookup module 52 for retrieval in step 106 of the storage location 66 based on the corresponding OID 68. If in step 108 the ID lookup module 52 is unable to identify the storage location 66 (e.g., in the case where the storage location "S2-535" for the directory "\\Dir2" is no longer available), the ID lookup module 52 can send in step 100 its own query to connected user nodes 32 for a stored location based on the OID 68; if in step 102 the reply includes valid data, namely confirmation by the replying user node 32 that it controls ownership (e.g., storage, read/write permissions, etc.) for the corresponding OID 68, the OID 68 and the identifier of the user node 32 having ownership of the corresponding data element 64 is cached in the directory table 62. Note that for remote queries, the ID service 50 will simply return the OID without the storage location in step 114.

Ultimately, if the storage location 66 for the OID is resolved by the ID lookup module 52, the ID lookup module fetches in step 112 the data object from the specified location, either locally or remotely. If necessary, the ID service module 50 will parse the data object 64 for any metadata (e.g., any linked-list values identifying the OID for another data object associated with the associated file), and decode the fetched data objects 64 to recover the originally-requested file. Read/write authorization also can be recovered based on regeneration of tokens that identify which node is authorized to write data at any given time, as described in the above-incorporated application Ser. No. 10/859,208.

According to the disclosed embodiment, a distributed data storage system can be substantially recovered based on distributed user nodes connecting and sharing distributed data having been replicated among each other. Hence, data can be recreated without the necessity of deploying new file servers. Moreover, the recovered data storage system can be deployed automatically based on having additional user nodes join the new network.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method comprising:
   connecting a first portable user computer to a second portable user computer via a data link; and
   the first portable user computer establishing a recovered data storage system with the second portable user computer based on a determined unavailability of a distributed storage system having multiple storage locations, the establishing including:
   identifying a first group of stored data elements to the second portable user computer, the first group of stored data elements having been stored in the first portable user computer based on replication thereof throughout the distributed storage system to a first group of the multiple storage locations including the first portable user computer, and
   receiving from the second portable user computer an identification of a second group of stored data elements having been stored in the second portable user computer based on the replication thereof throughout the distributed storage system to a second group of the multiple storage locations including the second portable user computer, the recovered data storage system based on the first and second groups of stored data elements.

2. The method of claim 1, wherein each of the stored data elements in the first group and the second group of stored data elements has a corresponding unique object identifier having been assigned by the distributed storage system and that is independent of any storage address on any storage medium, at least one of the stored data elements being a data file having been replicated by distributed storage system among at least two of the multiple storage locations.

3. The method of claim 2, wherein the identifying includes:
   receiving from the second portable user computer a query specifying a name for one of the stored data elements of the first group; and
   resolving the name based on supplying to the second portable user computer at least one of the stored data elements of the first group, or the corresponding unique object identifier assigned to the one stored data element of the first group by the distributed storage system.

4. The method of claim 2, further comprising recovering a data file from selected stored data elements of the recovered data storage system based on performing Reed-Solomon decoding.

5. The method of claim 2, wherein the establishing includes the first portable user computer sending the unique object identifiers of at least a portion of the first group of stored data elements to the second portable user computer.

6. The method of claim 5, wherein the establishing further includes the first portable user computer receiving the unique object identifiers of at least a portion of the second group of stored data elements from the second portable user computer.

7. The method of claim 1, wherein the identifying includes:
   receiving from the second portable user computer a query specifying a name for one of the stored data elements of the first group; and
   resolving the name based on supplying to the second portable user computer at least one of the one stored data element of the first group, or a corresponding unique object identifier assigned to the one stored data element of the first group by the distributed storage system, the unique object identifier independent of any storage address on any storage medium, the one stored data element being a data file having been replicated by distributed storage system among at least two of the multiple storage locations.

8. The method of claim 1, further comprising recovering a data file from selected stored data elements of the recovered data storage system based on performing Reed-Solomon decoding.

9. A portable user computer comprising:
   a data storage medium configured for storing a first group of stored data elements based on communication by the portable user computer with a distributed storage system having replicated the first group of stored data elements to a first group of multiple storage locations in the distributed storage system, the first group of multiple storage locations including the portable user computer; and circuitry configured for establishing a recovered data storage system with a second portable user computer based on a determined unavailability of a distributed storage system, the circuitry configured for identifying the first group of stored data elements to the second portable user computer, and receiving from the second portable user computer an identification of a second group of stored data elements having been stored in the second portable user computer based on the replication thereof by the distributed storage system to a second group of the multiple storage locations including the second portable user computer, the recovered data storage system based on the first and second groups of stored data elements.

10. The portable user computer of claim 9, wherein each of the stored data elements in the first group and the second group of stored data elements has a corresponding unique object identifier having been assigned by the distributed storage system and that is independent of any storage address on any storage medium, at least one of the stored data elements being a data file having been replicated by distributed storage system among at least two of the multiple storage locations.

11. The portable user computer of claim 10, wherein the circuitry is configured for sending the unique object identifiers of at least a portion of the first group of stored data elements to the second portable user computer.

12. The portable user computer of claim 11, wherein the circuitry is configured for receiving the unique object identifiers of at least a portion of the second group of stored data elements from the second portable user computer.

13. The portable user computer of claim 10, wherein:
the circuitry is configured for receiving from the second portable user computer a query specifying a name for one of the stored data elements of the first group;
the circuitry configured for resolving the name based on supplying to the second portable user computer at least one of the stored data elements of the first group, or the corresponding unique object identifier assigned to the one stored data element of the first group by the distributed storage system.

14. The portable user computer of claim 10, wherein the circuitry is configured for recovering a data file from selected stored data elements of the recovered data storage system based on performing Reed-Solomon decoding.

15. The portable user computer of claim 9, wherein:
the circuitry is configured for receiving from the second portable user computer a query specifying a name for one of the stored data elements of the first group;
the circuitry configured for resolving the name based on supplying to the second portable user computer at least one of the one stored data element of the first group, or a corresponding unique object identifier assigned to the one stored data element of the first group by the distributed storage system, the unique object identifier independent of any storage address on any storage medium, the one stored data element being a data file having been replicated by distributed storage system among at least two of the multiple storage locations.

16. The portable user computer of claim 9, wherein the circuitry is configured for recovering a data file from selected stored data elements of the recovered data storage system based on performing Reed-Solomon decoding.

17. A non-transitory computer readable medium having stored thereon sequences of instructions for execution by a first portable user computer, the sequences of instructions including instructions for:
connecting the first portable user computer to a second portable user computer via a data link; and
the first portable user computer establishing a recovered data storage system with the second portable user computer based on a determined unavailability of a distributed storage system having multiple storage locations, the establishing including:
identifying a first group of stored data elements to the second portable user computer, the first group of stored data elements having been stored in the first portable user computer based on replication thereof throughout the distributed storage system to a first group of the multiple storage locations including the first portable user computer, and
receiving from the second portable user computer an identification of a second group of stored data elements having been stored in the second portable user computer based on the replication thereof throughout the distributed storage system to a second group of the multiple storage locations including the second portable user computer, the recovered data storage system based on the first and second groups of stored data elements.

18. The medium of claim 17, wherein each of the stored data elements in the first group and the second group of stored data elements has a corresponding unique object identifier having been assigned by the distributed storage system and that is independent of any storage address on any storage medium, at least one of the stored data elements being a data file having been replicated by distributed storage system among at least two of the multiple storage locations.

19. The medium of claim 17, wherein the identifying includes:
receiving from the second portable user computer a query specifying a name for one of the stored data elements of the first group; and
resolving the name based on supplying to the second portable user computer at least one of the one stored data element of the first group, or a corresponding unique object identifier assigned to the one stored data element of the first group by the distributed storage system, the unique object identifier independent of any storage address on any storage medium, the one stored data element being a data file having been replicated by distributed storage system among at least two of the multiple storage locations.

20. The medium of claim 17, further comprising instructions for recovering a data file from selected stored data elements of the recovered data storage system based on performing Reed-Solomon decoding.

\* \* \* \* \*